(12) United States Patent
Wang et al.

(10) Patent No.: US 11,100,370 B2
(45) Date of Patent: Aug. 24, 2021

(54) METHOD OF USING DEEP DISCRIMINATE NETWORK MODEL FOR PERSON RE-IDENTIFICATION IN IMAGE OR VIDEO

(71) Applicant: Peking University Shenzhen Graduate School, Shenzhen (CN)

(72) Inventors: Wenmin Wang, Shenzhen (CN); Yihao Zhang, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 122 days.

(21) Appl. No.: 16/622,929

(22) PCT Filed: Jan. 23, 2018

(86) PCT No.: PCT/CN2018/073708
§ 371 (c)(1),
(2) Date: Dec. 16, 2019

(87) PCT Pub. No.: WO2019/010950
PCT Pub. Date: Jan. 17, 2019

(65) Prior Publication Data
US 2021/0150268 A1    May 20, 2021

(30) Foreign Application Priority Data
Jul. 13, 2017   (CN) .......................... 201710570245.1

(51) Int. Cl.
*G06K 9/62*    (2006.01)
*G06K 9/00*    (2006.01)
(Continued)

(52) U.S. Cl.
CPC ....... *G06K 9/6257* (2013.01); *G06K 9/00362* (2013.01); *G06K 9/6215* (2013.01);
(Continued)

(58) Field of Classification Search
CPC ............. G06K 9/6257; G06K 9/00362; G06K 9/6215; G06K 9/6262; G06K 9/6272;
(Continued)

(56) References Cited

U.S. PATENT DOCUMENTS 11,023,715 B2 *  6/2021  Qiu ...................... G06N 3/0454
2020/0082165 A1 *  3/2020  Wang ................... G06K 9/4628

FOREIGN PATENT DOCUMENTS

CN     2017-481439    *  3/2017    ......... G06K 9/00228

OTHER PUBLICATIONS

Zhao, "Unsupervised salience learning for person re-identification," in IEEE Conference on Computer Vision and Pattern Recognition, publication year 2013, pp. 3586-3593. (Year: 2013).*
(Continued)

*Primary Examiner* — Juan A Torres
(74) *Attorney, Agent, or Firm* — SV Patent Service

(57) ABSTRACT

Disclosed is a deep discriminative network for person re-identification in an image or a video. Concatenation are carried out on different input images on a color channel by constructing a deep discriminative network, and an obtained splicing result is defined as an original difference space of different images. The original difference space is sent into a convolutional network. The network outputs the similarity between two input images by learning difference information in the original difference space, thereby realizing person re-identification. The features of an individual image are not learnt, and concatenation are carried out on input images on a color channel at the beginning, and difference information is learnt on an original space of the images by using a
(Continued)

designed network. By introducing an Inception module and embedding the same into a model, the learning ability of a network can be improved, and a better differentiation effect can be achieved.

10 Claims, 2 Drawing Sheets

(51) Int. Cl.
    *G06N 3/04*     (2006.01)
    *G06N 3/08*     (2006.01)

(52) U.S. Cl.
    CPC .............. *G06K 9/6262* (2013.01); *G06N 3/04* (2013.01); *G06N 3/08* (2013.01)

(58) Field of Classification Search
    CPC ........ G06K 9/00778; G06K 9/54; G06N 3/04; G06N 3/08
    USPC .......................................................... 382/103
    See application file for complete search history.

(56) References Cited

OTHER PUBLICATIONS

Kostinger, "Large scale metric learning from equivalence constraints," in Computer Vision and Pattern Recognition, publication year 2012, pp. 2288-2295. (Year: 2012).*
Li, "DeepREID: Deep filter pairing neural network for person re-identification," in IEEE Conference on Computer Vision and Pattern Recognition, publication year 2014, pp. 152-159. (Year: 2014).*
Ahmed, "An improved deep learning architecture for person re-identification," in IEEE Conference on Computer Vision and Pattern Recognition, publication year 2015, pp. 3908-3916 (Year: 2015).*
Wang, "Joint learning of single-image and cross-image representations for person re-identification," in IEEE Conference on Computer Vision and Pattern Recognition, publication year 2016, pp. 1288-1296. (Year: 2016).*
Wu, "PersonNet: Person re-identification with deep convolutional Neural Networks" arXiv publication Jun. 20, 2016. (Year: 2016).*
Subramaniam, "Deep neural networks with inexact matching for person re-identification," in Advances in Neural Information Processing Systems 29, publication year 2016, pp. 2667-2675. (Year: 2016).*
Liao, "Person re-identification by local maximal occurrence representation and metric learning," in Computer Vision and Pattern Recognition (CVPR), publication year 2015, pp. 2197-2206.). (Year: 2015).*
Martinel, "Kernelized saliency based person re-identification through multiple metric learning," IEEE Transactions on Image Processing, vol. 24, No. 12, pp. 5645-5658, publication year 2015. (Year: 2015).*
Huang, "Nonlinear local metric learning for person re-identification," arXiv, publication Nov. 16, 2015. (Year: 2015).*
Su, "Deep attributes driven multi-camera person re-identification," arXiv preprint arXiv:1605.03259, publication year 2016. (Year: 2016).*
Tao, "Person re-identification by dual-regularized kiss metric learning," IEEE Transactions on Image Processing a Publication of the IEEE Signal Processing Society, vol. 25, No. 6, pp. 2726-2738, publication year 2016. (Year: 2016).*
Chen, "Similarity learning with spatial constraints for person re-identification," in IEEE Conference on Computer Vision and Pattern Recognition, publication year 2016, pp. 1268-1277. (Year: 2016).*
Bai, "Scalable person re-identification on supervised smoothed manifold," arXiv preprint arXiv:1703.08359, publication year 2017. (Year: 2017).*
Davis, "Information theoretic metric learning," in Machine Learning, Proceedings of the Twenty-Fourth International Conference, publication year 2007, pp. 209-216. (Year: 2007).*
Xiong, "Person re-identification using kernel-based metric learning methods," in European conference on computer vision. Springer, publication year 2014, pp. 1-16. (Year: 2014).*
Dong, "Deep metric learning for person re-identification," in International Conference on Pattern Recognition, publication year 2014, pp. 34-39 (Year: 2014).*
Zhang, "Learning a discriminative null space for person re-identification," in IEEE Conference on Computer Vision and Pattern Recognition, publication year 2016, pp. 1239-1248. (Year: 2016).*
Paisitkriangkrai, "Learning to rank in person re-identification with metric ensembles," in IEEE Conference on Computer Vision and Pattern Recognition, publication year 2015, pp. 1846-1855. (Year: 2015).*
Cheng, "Person re-identification by multi-channel parts-based CNN with improved triplet loss function," in IEEE Conference on Computer Vision and Pattern Recognition, publication year 2016, pp. 1335-1344. (Year: 2016).*
Chen, "A multi-task deep network for person re-identification," in Thirty-First AAAI Conference on Artificial Intelligence, publication year 2017. (Year: 2017).*
Zhang, "People re-identification using deep convolutional neural network," Published in: 2014 International Conference on Computer Vision Theory and Applications (VISAPP) (vol. 3, pp. 216-223) Publication Date: Jan. 1, 2014. (Year: 2014).*
Geng, "Deep Transfer Learning for Person Re-identification," arXiv Article Publication Date: Nov. 16, 2016. (Year: 2016).*
Song, "Deep convolutional neural networks with adaptive spatial feature for person re-identification ," Published in: 2017 IEEE 2nd Advanced Information Technology, Electronic and Automation Control Conference (IAEAC) (pp. 2020-2023) Publication Date: Mar. 1, 2017 (Year: 2017).*
Jin, "Deep Person Re-Identification with Improved Embedding and Efficient Training." arXiv Article Publication Date: May 9, 2017. (Year: 2017).*
Wang, "Deep Features for Person Re-identification" 11th International Conference on Semantics, Knowledge and Grids (SKG) (pp. 244-247) Publication Date: Aug. 1, 2015. (Year: 2015).*
Zheng, "A Discriminatively Learned CNN Embedding for Person Re-identification" arXiv Feb. 3, 2017. (Year: 2017).*
Song, "Collaborative Deep Networks for Pedestrian Detection," 2017 IEEE Third International Conference on Multimedia Big Data (BigMM) (pp. 146-153 Publication Date: Apr. 1, 2017. (Year: 2017).*
Zhang, "Deep discriminative network with inception module for person re-identification," Published in: 2017 IEEE Visual Communications and Image Processing (VCIP). Date of Conference: Dec. 10-13, 2017 (Year: 2017).*

* cited by examiner

METHOD OF USING DEEP DISCRIMINATE NETWORK MODEL FOR PERSON RE-IDENTIFICATION IN IMAGE OR VIDEO

TECHNICAL FIELD

The present invention relates to the field of person re-identification in computer vision, and specifically, to a deep discriminative network for person re-identification in an image or a video.

BACKGROUND OF THE INVENTION

In recent years, as people pay more attention to the public safety, video surveillance systems have become popular. Public places such as airports, train stations, campuses and office buildings are in urgent need of surveillance to protect the security. Faced with massive monitoring video data, a large amount of manpower needs to be invested in the monitoring and retrieval of video information. This method has low efficiency and causes additional waste of resources. With computer vision analysis technology to automatically monitor and analyze video information, the construction of safe city will be accelerated.

Person re-identification is a key task in the study of computer vision. In general, for an image or a video about a pedestrian, person re-identification is the process of recognizing the same person in other images or videos that do not coincide with the shooting scene. Although relevant research has received more attention, and the accuracy of person re-identification has increased a lot, there are still many difficulties to be overcome. Since the pedestrian image to be recognized is taken by a camera different from the original image, the difference in camera may bring errors to imaging conditions; the environment in different scenes may be different, and the collected data may also have different deviations; changes in lighting can make the same color different; and more importantly, the change of posture and occlusion of pedestrians under the camera makes the recognition of the same person difficult.

In recent years, convolutional neural networks are widely used in the field of person re-identification following the trend of deep learning. Extracting image features through deep networks, and using deep learning or traditional methods for distance measurement on corresponding feature space greatly improve the accuracy of person re-identification. The progress of these work benefits from the ability of the deep convolutional network model to extract features, but the exploration on the discrimination ability is limited to the given feature space, thus limiting the improvement of depth model discrimination ability.

SUMMARY OF THE INVENTION

To overcome the above deficiencies of the prior art, the present invention provides a deep discriminative network model method for person re-identification in an image or a video. Based on the similarity judgment process of pedestrians between different images, a deep discriminative network model is designed. Concatenation are carried out on two input images on a color channel, the similarity between the images is discriminated in the original image difference space, and the learning ability of network is improved by embedding Inception module, so as to effectively distinguish whether the input images belong to the same person. In the present invention, the features of an individual image are not extracted, and there is no traditional step of extracting the feature from the input image, so the potential of the deep convolutional neural network model in discriminating image difference can be fully utilized.

In the present invention, concatenation are first carried out on two input images on a color channel, and an obtained splicing result is defined as an original difference space of two images, and then an obtained splicing result is sent into the designed convolutional neural network, and the network can finally calculate the similarity between two input images by learning difference information in original space. The deep discriminative network in the present invention comprises a generated original difference space and a convolutional network, and the convolutional network comprises three connected convolutional modules and one Inception module, followed by an asymmetric convolutional layer and a fully connected layer. The similarity between images can be obtained by using the SoftMax algorithm.

The technical scheme proposed in the present invention: Disclosed is a deep discriminative network model method for person re-identification in an image or a video. Concatenation are carried out on two input images on a color channel by constructing a deep discriminative network, an obtained splicing result is sent into a convolutional network, and the said deep discriminative network outputs the similarity between two input images by learning difference information in original difference space, thereby realizing person re-identification; specifically, comprising the steps of:

1) designing the structure of a deep discriminative network model;

The deep discriminative network in the present invention comprises a generated original difference space and a convolutional network, where the convolutional network comprises three connected convolutional modules and one Inception module, followed by an asymmetric convolutional layer and a fully connected layer;

11) constructing the original difference space of the image;

Concatenation are carried out on two input images on a color channel (R, G, B), to make an "image" containing 6 channels (R, G, B, R, G, B), and the "image" is defined as an original difference space of the two images, as the object of direct learning of convolutional neural network;

12) designing three connected convolutional modules for learning the difference information of input object;

Each module contains 2 convolutional operations, 1 ReLU mapping, and 1 maximum pooling operation, where the size of the convolutional kernel is 3*3, the step is 1, the sampling size is 2*2, and the step is 2;

13) designing an Inception module following the convolutional module to increase the depth and width of the network; and 14) designing an asymmetric convolutional operation to further reduce the difference dimension and using the full connection and SoftMax methods to calculate the similarity between the input images;

2) setting the pedestrian image in the data set X with the same size, and dividing into the training set T and the test set D;

In the specific embodiment of the present invention, the pedestrian images in data set X are uniformly set with the size of 160*60, and randomly divided into the training set T and the test set D;

3) training the deep discriminative network constructed in training Step 1) with training set T, updating the learning parameters until convergence, and obtaining the trained deep discriminative network model; comprising the steps of:

31) performing data augmentation on the images in the training set T by:
   A. horizontally flipping the image in the training set T to obtain a mirror image of each image;
   B. taking the center of each image in the training set T (including the mirror image generated in Step A) as a reference, sampling multiple images (e.g. 5 images. The purpose of sampling is to increase the number of training samples) randomly offset in the horizontal and vertical directions for a certain size as samples. In the specific embodiment of the present invention, the offset is [−0.05H, 0.05H]*[−0.05 W, 0.05 W], and H and W are the height and width of the original image, respectively;

32) pre-processing the sample: Calculate the mean and variance of all samples in the training set, and then normalize all the images (including the training set and the test set) to obtain the normal-distributed sample data as follow-up training sample data;

33) generating training samples: All samples of each person form a similarity pair with each other. For each similarity pair, randomly select two images from the samples of all others to form a dissimilarity pair with one of the samples, so as to control the ratio of similarity pairs to dissimilarity pairs at 1:2 as the final training sample; and 34) using the batch training method, randomly sampling 128 pairs of pedestrian images from the training samples, and updating the network parameters with the random gradient descent method until convergence, to obtain the trained deep discriminative network model;

In the specific embodiment of the present invention, sample 128 pairs for batch training on pedestrian images; wherein when using the random gradient descent method, the learning rate is set as 0.05, the momentum is 0.9, the learning rate is attenuated to 0.0001, and the weight attenuation is 0.0005;

The trained deep discriminative network model can be evaluated by using the pedestrian image in test set D; and 4) using the trained deep discriminative network model to identify the test data set D, verifying whether the pedestrians in the two input images in the test data set D belong to the same pedestrian, and obtaining the accuracy rate.

The SoftMax algorithm is used in the present invention to obtain similarities between images.

Compared with the prior art, the beneficial effects of the present invention are:

The present invention provides a deep discriminative network model method for person re-identification in an image or a video, and further explores the potential of the deep convolutional neural network model in discriminating image disparity. Compared with the prior art, the present invention no longer learns the features of the individual images, but concatenation is carried out on input images on a color channel at the beginning, so that the designed network learns their difference information in the original space of the image. By introducing the Inception module and embedding it into the model, the learning ability of the network can be improved, and a better discriminating effect can be achieved.

DETAILED DESCRIPTION OF THE INVENTION

The present invention will become apparent from the following detailed description of embodiments and from the accompanying drawings, but not limited to the scope of the invention in any way.

Figure 1:
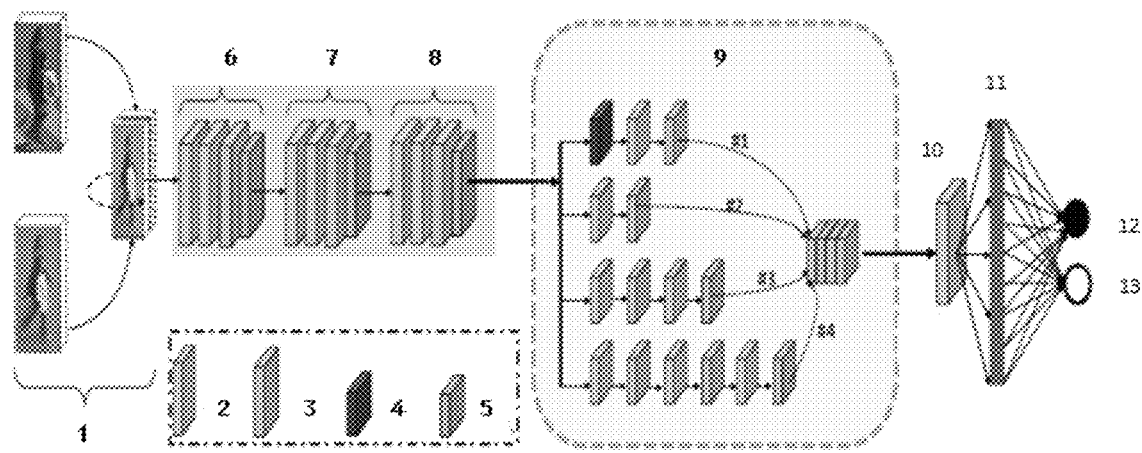
FIG. 1 is a schematic diagram for the deep discriminative network model constructed in the present invention, where, (1) is the fusion of two images on a color channel; (2) is the convolutional layer; (3) is the ReLU activation function; (4) is the mean pooling; (5) is the maximum pooling; (6) is the convolutional block Conv-B 1, the number of cores of the two convolutional layers is 32 and 64; (7) is the convolutional block Conv-B 2, the number of cores of the two convolutional layers is 64 and 64; (8) is the convolutional block Conv-B 3, the number of cores of the two convolutional layers is 64 and 64 in sequence; (9) is the Inception module, where #1, #2, #3, and #4 are 4 parallel subnets respectively; (10) is a convolutional layer Conv-L, the number of cores is 64; (11) is the fully connected layer+ SoftMax layer; (12) is the probability of output similarity; and (13) is the probability of output dissimilarity.

The present invention proposes a deep discriminative network model algorithm (hereinafter referred to as DDN-IM) for person re-identification, and its structure is shown in FIG. 1. The algorithm is a sample dichotomy, that is, judging whether the pedestrians in the two images input belong to the same pedestrian, and does not involve the pedestrian positioning and extraction process in the early stage. The algorithm mainly comprises of the following two steps:

1. designing the deep discriminative network architecture, comprising the steps of:
   1) constructing the original difference space of the image. Concatenation are carried out on two input images on a color channel (R, G, B), to make an "image" containing 6 channels (R, G, B, R, G, B), and the "image" is defined as the object of direct learning of the network;
   2) designing three connected convolutional modules for learning the difference information of the input object. Each module contains 2 convolutional operations, 1 ReLU mapping, and 1 maximum pooling operation. The size of the convolutional kernel is 3*3, the step is 1, the sampling size is 2*2, the step is 2, and other parameters are shown in FIG. 1;
   3) designing an Inception module following the convolutional module to increase the depth and width of the network. The structure setting and related parameters of the Inception module are shown in Table 1, where the subnet refers to four parallel networks in the module; and

TABLE 1

Structure settings and related parameters of Inception module

| Subnet Number | Type | Core Size/Step Size/Fill | Input Size |
|---|---|---|---|
| #1 | Mean pooling | 3*3/1/0 | 64*16*4 |
| — | Convolution (ReLU) | 1*1/1/0 | 64*16*4 |
| #2 | Convolution (ReLU) | 1*1/1/0 | 64*16*4 |
| #3 | Convolution (ReLU) | 1*1/1/0 | 64*16*4 |
|  | Convolution (ReLU) | 3*3/1/0 | 64*16*4 |
| #4 | Convolution (ReLU) | 1*1/1/0 | 64*16*4 |
|  | Convolution (ReLU) | 3*3/1/0 | 64*16*4 |
|  | Convolution (ReLU) | 3*3/1/0 | 96*16*4 |

4) Finally, designing an asymmetric convolutional operation to further reduce the difference dimension and using the full connection and SoftMax methods to calculate the similarity between the input images.

2. training of deep discriminative network (parameter learning):
   1) setting uniformly the pedestrian image in the data set X with the size of 160*60, and dividing into the training set T and the test set D;
   2) performing data augmentation on the images in training set T by:
      (a) horizontally flipping the image to get a mirror image;
      (b) taking the center of image as a reference, and sampling 5 images randomly offset in the horizontal and vertical directions for a certain size;
   3) using batch training method, sampling 128 pairs of pedestrian images and updating the network parameters with the random gradient descent method until convergence, where the learning rate is set as 0.05, the momentum is 0.9, the learning rate is attenuated to 0.0001, and the weight attenuation is 0.0005; and
   4) evaluating the deep network by using the pedestrian image in test set D.

Figure 2:
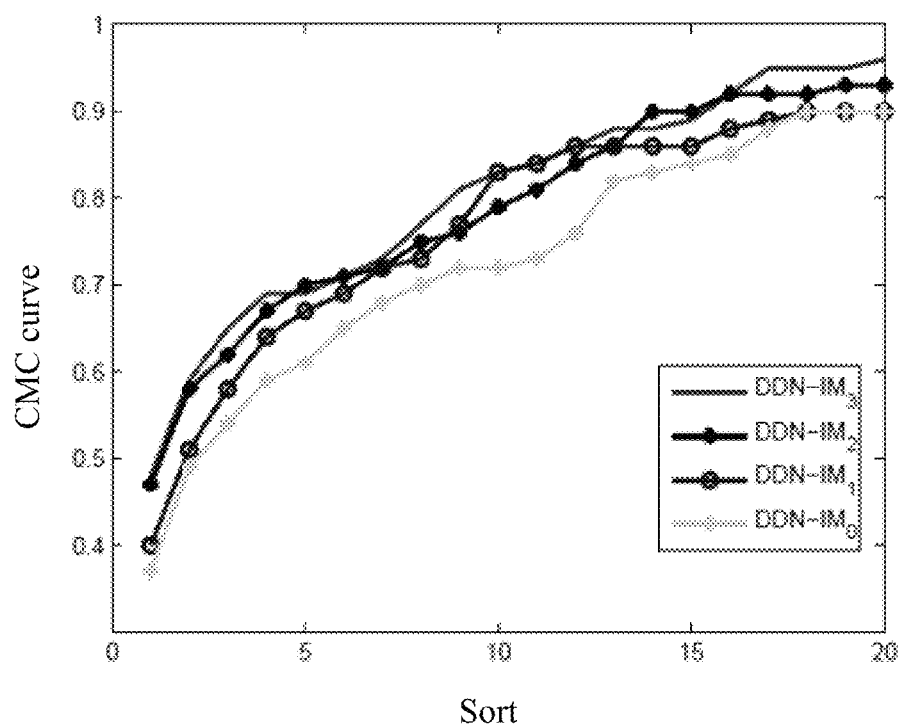
FIG. 2 shows a comparison of the recognition results obtained when the Inception module is placed at different locations on the deep discriminative network.
Figure 3:
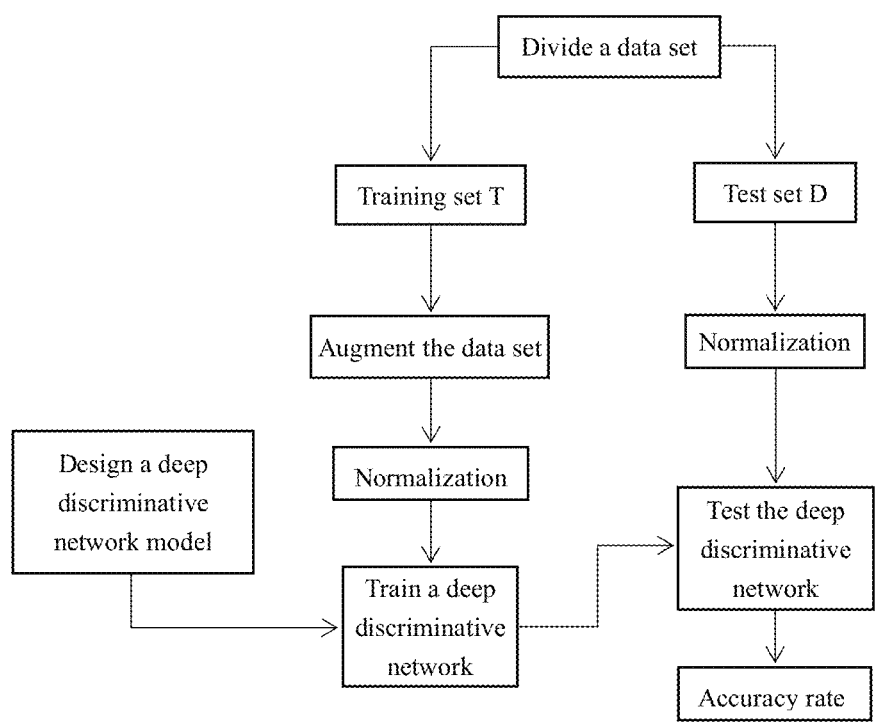
FIG. 3 is a block flow diagram of the method in the present invention.

In order to verify the effect of Inception module in the deep discriminative network model, the present invention performs corresponding comparison experiments according to whether or not the Inception module is used and Inception are respectively placed behind different convolutional modules, and the result is shown in FIG. 2, where DDN-IM$_0$, DDN-IM$_1$, DDN-IM$_2$ and DDN-IM$_3$ indicate that the Inception module is not used, and the Inception module is placed behind the convolutional module 1, 2, and 3 respectively. It can be seen that the model using the Inception module is better than that not using the module, and the later it is placed, the more obvious the improvement is. Table 2 lists the results of CMC (Cumulative Match Characteristic) obtained with different methods on the CUHK01 data set.

TABLE 2

CMC results obtained with different methods on the CUHK01 data set

| Method | Rank = 1 | Rank = 5 | Rank = 10 | Rank = 20 | Reference |
|---|---|---|---|---|---|
| eSDC | 22.84 | 43.89 | 57.67 | 49.84 | CVPR 2013 |
| KISSME | 29.40 | 57.67 | 62.43 | 86.07 | CVPR 2012 |
| FPNN | 27.84 | 58.20 | 73.46 | 86.31 | CVPR 2014 |
| IDLA | 65.00 | 89.50 | 93.12 | 97.20 | CVPR 2015 |
| SIRCIR | 72.50 | 91.00 | 95.50 | / | CVPR 2016 |
| PersonNet | 71.14 | 90.07 | 95.00 | 98.06 | arXiv 2016 |
| Norm X-Corr | 77.43 | / | 96.67 | 98.67 | NIPS 2016 |
| The present invention | 79.67 | 94.00 | 96.33 | 98.67 | / |

In Table 2, eSDC (existing Salience Detection Combination) is a significance detection method combined with a conventional method documented in literature (R. Zhao, W. Ouyang, and X. Wang, "Unsupervised salience learning for person re-identification," in IEEE Conference on Computer Vision and Pattern Recognition, 2013, pp. 3586-3593.); KISSME (Keep It Simple and Straightforward Metric Learning) is documented in the literature (M. Hirzer, "Large scale metric learning from equivalence constraints," in Computer Vision and Pattern Recognition, 2012, pp. 2288-2295.). FPNN (Filter pairing neural network) is documented in the literature (W. Li, R. Zhao, T. Xiao, and X. Wang, "Deepreid: Deep filter pairing neural network for person re-identification," in IEEE Conference on Computer Vision and Pattern Recognition, 2014, pp. 152-159.); IDLA (Improved Deep Learning Architecture) is documented in the literature (E. Ahmed, M. Jones, and T. K. Marks, "An improved deep learning architecture for person re-identification," in IEEE Conference on Computer Vision and Pattern Recognition, 2015, pp. 3908-3916.); SIRCIR (Single-Image Representation and Cross-Image Representation) is documented in the literature (F. Wang, W. Zuo, L. Lin, D. Zhang, and L. Zhang, "Joint learning of single-image and cross-image representations for person re-identification," in IEEE Conference on Computer Vision and Pattern Recognition, 2016, pp. 1288-1296.); PersonNet (Person Network) is documented in the literature (L. Wu, S. C., and A. van den Hengel, "PersonNet: Person re-identification with deep convolutional Neural Networks" arXiv Jun. 20, 2016.); and Norm X-Corr (Normalize Cross Correlation) is documented in the literature (A. Subramaniam, M. Chatterjee, and A. Mittal, "Deep neural networks with inexact matching for person re-identification," in Advances in Neural Information Processing Systems 29, 2016, pp. 2667-2675.).

TABLE 3

CMC results obtained with different methods on the QMUL GRID data set

| Method | Rank = 1 | Rank = 5 | Rank = 10 | Rank = 20 | Reference |
|---|---|---|---|---|---|
| LOMO + XQDA | 16.56 | 33.84 | 41.84 | 47.68 | CVPR 2015 |
| KEPLER | 18.40 | 39.12 | 50.24 | 57.04 | TIP 2015 |
| Norm X-Corr | 19.20 | 38.40 | 53.60 | 66.40 | NIPS 2016 |
| NLML | 24.54 | 35.86 | 43.53 | / | CS 2015 |
| SSDAL + XQDA | 22.40 | 39.20 | 48.00 | / | ArXiv 2016 |
| DR-KISS | 20.60 | 39.30 | 51.40 | / | TIP 2016 |
| SCSP | 24.24 | 44.56 | 54.08 | 59.68 | CVPR 2016 |
| SSM | 27.20 | / | 61.12 | 70.56 | arXiv 2017 |
| The present invention | 32.80 | 56.00 | 64.80 | 80.80 | / |

In Table 3, LOMO+XQDA (Local Maximum Occurrence and Cross-view Quadratic Discriminant Analysis) is documented in the literature (S. Liao, Y. Hu, X. Zhu, and S. Z. Li, "Person re-identification by local maximal occurrence representation and metric learning," in Computer Vision and Pattern Recognition (CVPR), 2015, pp. 2197-2206.); KEPLER (KErnelized saliency-based Person re-identification through multiple metric LEaRning) is documented in the literature (N. Martinel, C. Micheloni, and G. L. Foresti, "Kernelized saliency based person re-identification through multiple metric learning," IEEE Transactions on Image Processing, vol. 24, no. 12, pp. 5645-5658, 2015.); NLML (Nonlinear local metric learning) is documented in the literature (S. Huang, J. Lu, J. Zhou, and A. K. Jain, "Nonlinear local metric learning for person re-identification," Computer Science, 2015.); SSDAL+XQDA (semi-supervised deep attribute learning and Cross-view Quadratic Discriminant Analysis) is documented in the literature (C. Su, S. Zhang, J. Xing, W. Gao, and Q. Tian, "Deep attributes driven multi-camera person re-identification," arXiv preprint arXiv:1605.03259, 2016.); DR-KISS (dual-regularizedkiss) is documented in the literature (D. Tao, Y. Guo, M. Song, Y. Li, Z. Yu, and Y. Y. Tang, "Person re-identification by dual-regularized kiss metric learning," IEEE Transactions on Image Processing A Publication of the IEEE Signal Processing Society, vol. 25, no. 6, pp. 2726-2738, 2016.); SCSP (Spatially Constrained Similarity function on Polynomial feature map) is documented in the literature (D.

Chen, Z. Yuan, B. Chen, and N. Zheng, "Similarity learning with spatial constraints for person re-identification," in IEEE Conference on Computer Vision and Pattern Recognition, 2016, pp. 1268-1277.); and SSM (Supervised smoothed manifold) is documented in the literature (S. Bai, X. Bai, and Q. Tian, "Scalable person re-identification on supervised smoothed manifold," arXiv preprint arXiv:1703.08359, 2017.).

TABLE 4

CMC results obtained with different methods on the PRID2011 data set

| Method | Rank = 1 | Rank = 5 | Rank = 10 | Rank = 20 | Reference |
|---|---|---|---|---|---|
| ITML | 12.00 | / | 36.00 | 47.00 | ICML 2007 |
| KISSME | 15.00 | / | 39.00 | 52.00 | CVPR 2012 |
| kLFDA | 22.40 | 46.60 | 58.10 | / | ECCV 2014 |
| DML | 17.90 | 37.50 | 45.90 | / | CVPR 2014 |
| NullReid | 29.80 | 52.90 | 66.00 | 76.50 | CVPR 2016 |
| Ensembles | 17.90 | 40.00 | 50.00 | 62.00 | CVPR 2015 |
| ImpTrpLoss | 22.00 | / | 47.00 | 57.00 | CVPR 2016 |
| MTDnet | 32.00 | 51.00 | 62.00 | / | AAAI 2017 |
| The present invention | 48.00 | 69.00 | 83.00 | 96.00 | / |

In Table 4, ITML (Information Theoretic Metric Learning) is documented in the literature (J. V. Davis, B. Kulis, P. Jain, S. Sra, and I. S. Dhillon, "Information theoretic metric learning," in Machine Learning, Proceedings of the Twenty-Fourth International Conference, 2007, pp. 209-216.); kLFDA (kernel Local Fisher Discriminant Classifier) is documented in the literature (F. Xiong, M. Gou, O. Camps, and M. Sznaier, "Person re-identification using kernel-based metric learning methods," in European conference on computer vision. Springer, 2014, pp. 1-16.); DML (Deep Metric Learning) is documented in the literature (Y. Dong, L. Zhen, S. Liao, and S. Z. Li, "Deep metric learning for person re-identification," in International Conference on Pattern Recognition, 2014, pp. 34-39); NullReid (Null space for person Reid) is documented in the literature (L. Zhang, T. Xiang, and S. Gong, "Learning a discriminative null space for person re-identification," in IEEE Conference on Computer Vision and Pattern Recognition, 2016, pp. 1239-1248.); Ensembles (Metric Ensembles) is documented in the literature (S. Paisitkriangkrai, C. Shen, and V. D. H. Anton, "Learning to rank in person re-identification with metric ensembles," in IEEE Conference on Computer Vision and Pattern Recognition, 2015, pp. 1846-1855.); ImpTrpLoss (Improved Triplet Loss) is documented in the literature (D. Cheng, Y. Gong, S. Zhou, J. Wang, and N. Zheng, "Person re-identification by multi-channel parts-based cnn with improved triplet loss function," in IEEE Conference on Computer Vision and Pattern Recognition, 2016, pp. 1335-1344.); and MTDnet (Multi-Task Deep Network) is documented in the literature (W. Chen, X. Chen, J. Zhang, and K. Huang, "A multi-task deep network for person re-identification," in Thirty-First AAAI Conference on Artificial Intelligence, 2017.).

As described above, the present invention has been tested on three different data sets and compared with other methods. Table 2, Table 3, and Table 4 list the CMC results obtained with different methods on the CUHK01 data set, the QMUL GRID data set, and the PRID2011 data set, respectively. As can be seen that, the deep discriminative network model proposed in the present invention has better performance, indicating the effectiveness of the algorithm.

It is to be noted that the above contents are further detailed description of the present invention in connection with the disclosed embodiments. The present invention is not limited to the embodiments referred to, but may be varied and modified by those skilled in the field without departing from the conception and scope of the present invention. The claimed scope of the present invention should be defined by the scope of the claims.

What is claimed is:

1. A deep discriminative network model method for person re-identification in image or video, comprising carrying out concatenation on different input images on a color channel to obtain a splicing result by constructing a deep discriminative network, defining an original difference space of different images using the splicing result, and sending the original difference space into a convolutional network, wherein the convolutional network outputs the similarity between two input images by learning difference information in the original difference space, thereby realizing person re-identification, the method comprising:
1) designing a deep discriminative network model, comprising an original difference space and a convolutional neural network, where the convolutional neural network comprises three connected convolutional modules and an inception module, followed by an asymmetric convolutional layer and a fully connected layer, comprising:
11) constructing an original difference space of the images by carrying out concatenation on different input images on a color channel, as an object of direct learning of the convolutional neural network;
12) designing three connected convolutional modules for learning the difference information of the input object;
13) designing an inception module following the convolutional module to increase the depth and width of the network; and
14) designing an asymmetric convolutional operation to further reduce the difference dimension and calculating the similarity between the input images;
2) setting a pedestrian image in a data set X with the same size, and dividing into a training set T and a test set D;
3) training the deep discriminative network constructed in training in step 1) with training set T updating the learning parameters until convergence, and obtaining the trained deep discriminative network model, comprising:
31) performing data augmentation on the images in the training set T with following methods to acquire multiple sample images;
32) pre-processing the said sample: calculate the mean and variance of all samples in the training set, and then normalize all the images (including the training set and the test set) to obtain the normal-distributed sample data as training sample data;
33) using training sample data to obtain similarity pairs and dissimilarity pairs, to generate a final training sample for each person; and
34) randomly sampling multi pairs of pedestrian images from the training samples by using a batch training method, and updating network parameters with a random gradient descent method until convergence, to obtain the trained deep discriminative network model; and
4) using a trained deep discriminative network model to identify the test data set D, verifying whether the pedestrians in the two input images in the test data set D belong to the same pedestrian, and obtaining the accuracy rate.

2. The deep discriminative network model method according to claim 1, wherein in step 11), concatenation are carried out on two input images on a color channel (R, G, B), to make an "image" containing 6 channels (R, G, B, R, G, B), and the "image" is defined as an original difference space of the two images.

3. The deep discriminative network model method according to claim 1, wherein in step 12), in three connected convolutional modules each module contains 2 convolutional operations, 1 ReLU mapping, and 1 maximum pooling operation.

4. The deep discriminative network model method according to claim 1, wherein in step 14), an asymmetric convolutional operation is designed to further reduce the difference dimension and the full connection and SoftMax methods are used to calculate the similarity between the input images.

5. The deep discriminative network model method according to claim 1, wherein in step 2, the pedestrian image in the data set X is set with the same size, and divided into the training set T and the test set D.

6. The deep discriminative network model method according to claim 1, wherein in step 31), data augmentation is performed on the images in the training set T by:
 A. horizontally flipping the image in training set T to obtain a mirror image of each image;
 B. taking the center of each image in training set T (including the mirror image generated in Step A) as a reference, sampling multiple images randomly offset in the horizontal and vertical directions for a certain size as samples, wherein the offset is [−0.05H, 0.05H]*[−0.05 W, 0.05 W], and H and W are the height and width of the original image, respectively.

7. The deep discriminative network model method according to claim 1, wherein in step 33), for each similarity pair of all samples of each person, two images are randomly selected from the samples of all others to form a dissimilarity pair with one of the samples as the final training sample.

8. The deep discriminative network model method according to claim 1, wherein in step 34), 128 pairs are sampled for batch training on pedestrian images, wherein using the random gradient descent method, the learning rate is set as 0.05, the momentum is 0.9, the learning rate is attenuated to 0.0001, and the weight attenuation is 0.0005.

9. The deep discriminative network model method according to claim 1, wherein in step 3), the trained deep discriminative network model can be evaluated by using the pedestrian image in test set D.

10. The deep discriminative network model method according to claim 3, wherein the size of the convolutional kernel is 3*3 with a step size of 1, the sampling size is 2*2 with a step size of 2.

* * * * *